United States Patent
Le Roux

(10) Patent No.: US 12,114,379 B2
(45) Date of Patent: Oct. 8, 2024

(54) MULTIPLE PAIRING

(71) Applicant: SAGEMCOM BROADBAND SAS, Rueil-Malmaison (FR)

(72) Inventor: Sylvain Le Roux, Rueil Malmaison (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 209 days.

(21) Appl. No.: 17/541,889

(22) Filed: Dec. 3, 2021

(65) Prior Publication Data
US 2022/0191954 A1    Jun. 16, 2022

(30) Foreign Application Priority Data
Dec. 14, 2020  (FR) ..................................... 2013133

(51) Int. Cl.
| | |
|---|---|
| *H04W 76/11* | (2018.01) |
| *G06F 3/0482* | (2013.01) |
| *H04W 76/15* | (2018.01) |
| *H04W 84/12* | (2009.01) |

(52) U.S. Cl.
CPC ........... *H04W 76/11* (2018.02); *G06F 3/0482* (2013.01); *H04W 76/15* (2018.02); *H04W 84/12* (2013.01)

(58) Field of Classification Search
CPC ..... H04W 76/11; H04W 76/15; H04W 84/12; G06F 3/0482
USPC ........................................................ 455/41.2
See application file for complete search history.

(56) References Cited

U.S. PATENT DOCUMENTS

| | | | | |
|---|---|---|---|---|
| 10,939,289 | B1* | 3/2021 | Krishnakumar | H04W 76/15 |
| 2009/0240814 | A1* | 9/2009 | Brubacher | H04W 4/21 |
| | | | | 709/227 |
| 2010/0146129 | A1* | 6/2010 | Nakahara | H04W 48/20 |
| | | | | 709/228 |
| 2013/0272164 | A1* | 10/2013 | Leonardos | H04W 8/22 |
| | | | | 370/254 |
| 2015/0055601 | A1* | 2/2015 | Adamovsky | H04W 84/20 |
| | | | | 370/329 |
| 2016/0094934 | A1* | 3/2016 | Yang | H04W 8/005 |
| | | | | 455/41.2 |
| 2018/0054845 | A1 | 2/2018 | Lee et al. | |
| 2019/0008024 | A1 | 1/2019 | Hidaka | |
| 2020/0008095 | A1* | 1/2020 | Patil | H04W 12/03 |
| 2021/0014776 | A1* | 1/2021 | Patil | H04W 48/16 |

OTHER PUBLICATIONS

Jul. 21, 2021 Search Report issued in French Patent Application No. 2013133.

* cited by examiner

*Primary Examiner* — Mong-Thuy T Tran
(74) *Attorney, Agent, or Firm* — R. Brian Drozd; Williams Mullen

(57) ABSTRACT

To pair a plurality of stations with a wireless access point, the wireless access point establishes a multiple pairing. The wireless access point includes, in broadcast beacon frames, a notification of triggering of multiple pairing, during a declaration period of predefined maximum duration. The wireless access point receives, during the declaration period, requests for participation in the multiple pairing coming from said stations. When the declaration period expires, the wireless access point implements individual pairings in turn with each of the stations in question.

17 Claims, 4 Drawing Sheets

MULTIPLE PAIRING

TECHNICAL FIELD

The present invention relates to a pairing of a plurality of stations, in a single pairing session, with a wireless access point of a wireless local area network. The present invention is particularly adapted to Wi-Fi networks.

PRIOR ART

Establishing wireless local area networks WLAN offers great flexibility to the users of communication devices, referred to as stations, such as computers, tablets, smartphones, set-top boxes STB, etc.

Such WLAN networks are established by wireless access points WAP, which are for example integrated in residential gateways RGW made available by internet access providers to users who have taken out a subscription with them. Complementary wireless access points WAP incorporated in extenders can be used for extending the radio coverage of these wireless local area networks WLAN.

In order not to enable any station to connect to a WLAN network and to have access to data exchanges occurring via the WLAN network, security protocols are implemented. Providing the security of the WLAN network must however not be achieved to the detriment of simplicity of configuration.

For example, in the context of a Wi-Fi network, the WPS (Wi-Fi Protected Setup) protocol may be implemented. The aim of the WPS protocol is to propose a configuration phase for securing a Wi-Fi network that is simple, and in particular accessible to users without particular knowledge about configuring communication networks.

The WPS protocol proposes at least three ways of enabling a station to pair with a wireless access point WAP, i.e. to recover from said wireless access point WAP encryption keys making it possible to communicate within the Wi-Fi network in a secure manner: the PIN (Personal Identification Number) pairing procedure, the PBC (Push-Button Configuration) pairing procedure and the NFC (Near Field Communication) pairing procedure.

The PBC pairing procedure is based on the fact that the user presses on a button, whether it be physical or virtual (i.e. on a graphical interface), both on the wireless access point WAP and on the station to be connected to the secured Wi-Fi network. The wireless access point WAP thus provides, during a period of time of predefined duration and to any station so requesting, systematic pairing authorisation.

This means that only one station can be paired in this way at a time. The PBC pairing procedure must therefore be repeated as many times as there are stations to be paired.

Although simple, this PBC pairing procedure can prove to be tedious when a plurality of stations must be paired to the same wireless access point WAP. This situation occurs for example when, in an installation, the wireless access point WAP is replaced (e.g. replacement of residential gateway or extender). In this case in fact all the stations that were previously paired with the previous wireless access point WAP must then be paired with the new wireless access point WAP.

The DPP (standing for "Device Provisioning Protocol") standard, which aims to replace the WPS protocol, provides other methods for pairing stations with a wireless access point WAP (such as for example for using a two-dimensional bar code, called QRCode). Nevertheless, the same limitation remains: it is necessary to repeat the pairing procedure as many times as there are stations to be paired.

It is therefore desirable to overcome these drawbacks of the prior art.

It is in particular desirable to provide a solution that makes it possible to accelerate the pairing of a plurality of stations.

It is in particular desirable to provide a solution that remains accessible to users without any particular knowledge about configuration of communication networks and which is still more simple to operate when there are a plurality of stations to be paired.

DISCLOSURE OF THE INVENTION

A multiple-pairing method for pairing a plurality of stations with a wireless access point of a wireless local area network is proposed, the wireless access point broadcasting beacon frames relating to the wireless local area network, the method being implemented by the wireless access point and comprising the following steps: including, in the broadcast beacon frames, a notification of triggering of multiple pairing including a multiple-pairing session identifier, during a declaration period of predefined maximum duration; receiving requests for participation in the multiple pairing coming from said stations, said requests including the multiple-pairing session identifier, and creating, from the requests received, a list of stations to be paired; and, when the declaration period expires, making individual pairings in turn with each of the stations in the list. Thus the pairing of a plurality of stations is accelerated while leaving the possibility for the stations that are not paired of all participating in the multiple pairing.

According to a particular embodiment, the method comprises: providing, for display on a graphical interface, the list of stations from which said requests were received; receiving a confirmation of the list of stations to be paired, or a selection of stations to be paired from the list provided; and making the individual pairings in turn, and for only the selected stations where applicable. Thus only the stations actually required by the user benefit from the multiple pairing.

According to a particular embodiment, said requests each include a hostname of the station that transmitted the request in question, and the list of the stations that is provided for display on the graphical interface is a list of said hostnames. Thus control by the user is simplified.

According to a particular embodiment, the list of the stations for display on the graphical interface is provided as the requests for participation in the multiple pairing are received, and the method comprises: receiving the confirmation of the list of the stations to be paired, or the selection of stations to be paired from the list provided, before the predefined maximum duration of the declaration period has expired, and ending the declaration period early. Thus the multiple pairing can be accelerated as soon as the user obtains the list of all the required stations.

According to a particular embodiment, the graphical interface is provided by a station previously paired with the wireless access point. Thus it is not necessary for the wireless access point to be itself equipped with a screen.

According to a particular embodiment, the beacon frames have a format defined by the IEEE 802.11 family of standards, and the notification of triggering of the multiple pairing is in the form of a structure of the dedicated information element IE type. Thus implementation in the Wi-Fi network is easy.

According to a particular embodiment, the method comprises: initiating each individual pairing by including, in the beacon frames, for each station to be paired in its turn, a notification of triggering of individual pairing including the MAC address of the station in question, the MAC address having been obtained by receiving the request for participation in the multiple pairing coming from the station in question.

According to a particular embodiment, the beacon frames have a format defined by the IEEE 802.11 family of standards, and the notification of triggering of individual pairing is in the form of a structure of the dedicated information element IE type. Thus implementation in the Wi-Fi networks is easy.

According to a particular embodiment, the wireless access point and the stations exchange messages in a format defined by the IEEE 802.11 family of standards, and comprising: initiating each individual pairing by sending, to each station to be paired, in its turn, a frame of the dedicated action frame type. Thus implementation in the Wi-Fi networks is easy.

According to a particular embodiment, the wireless access point and the stations exchange messages in a format defined by the IEEE 802.11 family of standards, and wherein the requests for participation in the multiple pairing are in the form of broadcast frames of the probe request type including a structure of the dedicated information element IE type. Thus implementation in the Wi-Fi networks is easy.

According to a particular embodiment, the wireless access point and the stations exchange messages in a format defined by the IEEE 802.11 family of standards, and wherein the requests for participation in the multiple pairing is in the form of dedicated frames of the "action frame" type. Thus implementation in the Wi-Fi networks is easy.

According to a particular embodiment, the method comprises, before the declaration period expires: on reception of a request for participation in another multiple pairing identified by another multiple-pairing session identifier, ending the multiple pairing. Thus pairings that are not required can be avoided.

According to a particular embodiment, the stations that send the requests for participation in the multiple pairing are stations that are not paired with any wireless access point at the time of receiving the multiple-pairing triggering notification. Thus replacing wireless access points is facilitated.

According to a particular embodiment, when a station detects more than one multiple pairing session in a predefined interval of time, the station in question ignores any proposal for multiple pairing and also ignores any proposal for individual pairing during a predefined period. Thus pairings that are not required can be avoided.

A computer program is also proposed, which can be stored on a medium and/or downloaded from a communication network, in order to be read by a processor. This computer program comprises instructions for implementing the method mentioned above in any one of the embodiments thereof, when said program is executed by the processor. An information storage medium storing such a computer program is also proposed.

A wireless access point configured for making a multiple pairing is also proposed, making it possible to pair a plurality of stations with a wireless access point of a wireless local area network, the wireless access point broadcasting beacon frames relating to the wireless local area network, the wireless access point comprising: means for including, in the broadcast beacon frames, a notification of triggering of multiple pairing including a multiple-pairing session identifier, during a declaration period of predefined maximum duration; means for receiving requests for participation in the multiple pairing coming from said stations, said requests including the multiple-pairing session identifier, and means for creating, from the requests received, a list of stations to be paired; and means for making, when the declaration period expires, multiple pairings in turn with each of the stations in the list.

A wireless access point configured for making a multiple pairing is also proposed, making it possible to pair a plurality of stations with a wireless access point of a wireless local area network, the wireless access point broadcasting beacon frames relating to the wireless local area network, the wireless access point comprising electronic circuitry configured for: including, in the broadcast beacon frames, a notification of triggering of multiple pairing including a multiple-pairing session identifier, during a declaration period of predefined maximum duration; receiving requests for participation in the multiple pairing coming from said stations, said requests including the multiple-pairing session identifier, and creating, from the requests received, a list of stations to be paired; and, when the declaration period expires, making individual pairings in turn with each of the stations in the list.

BRIEF DESCRIPTION OF THE DRAWINGS

The features of the invention mentioned above, as well as others, will emerge more clearly from the reading of the following description of at least one example embodiment, said description being made in relation to the accompanying drawings, among which.

DETAILED DISCLOSURE OF EMBODIMENTS

The context of the following disclosure is that of a wireless local area network WLAN 120 managed by a wireless access point WAP 150 and wherein stations STA 111, 112, 113 must be paired with the wireless access point WAP 150 in order to be able to benefit from communication services offered by the wireless local area network WLAN 120. The wireless local area network WLAN 120 is preferentially a Wi-Fi network arranged to allow multiple pairing as disclosed hereinafter.

Figure 1A:
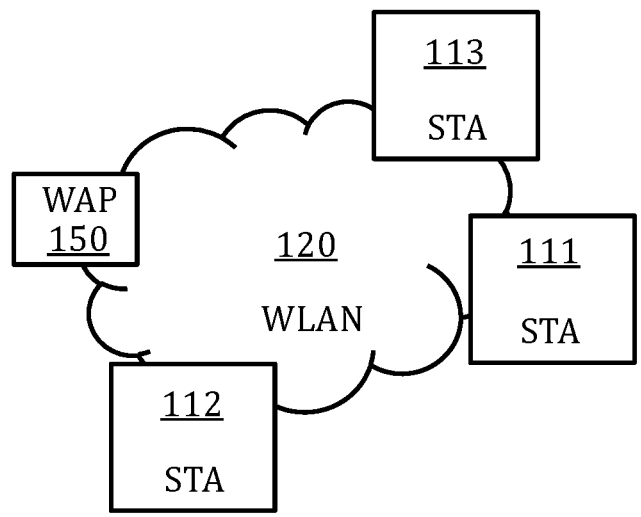
FIG. 1A illustrates schematically a first example of a communication system.

FIG. 1A illustrates schematically a first example of a communication system. The communication system comprises the wireless access point WAP 150 and the stations STA 111, 112, 113. The stations STA 111, 112, 113 are within radio range of the wireless access point WAP 150 and therefore within the radio coverage of the wireless local area network WLAN 120. The stations STA 111, 112, 113 are therefore able to receive beacon frames sent by the wireless access point WAP 150 to signal the wireless local area network WLAN 120. The wireless access point WAP 150 is for example an extender which, conjointly with at least one other wireless access point WAP 150 to which said wireless access point WAP 150 is connected and communicates via a backbone communication network (not shown, also called a "backhaul link"), makes it possible to extend the radio coverage of the wireless local area network WLAN 120.

Figure 1B:
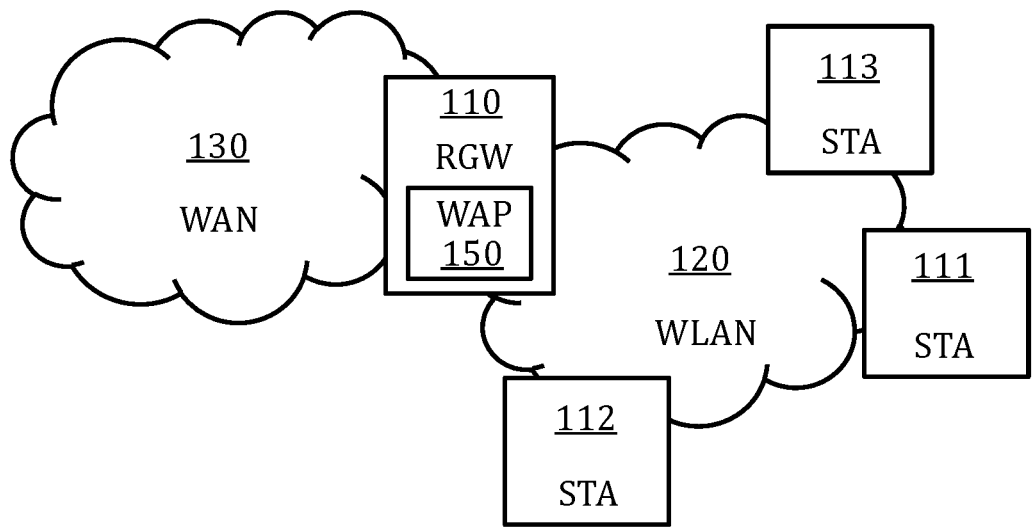
FIG. 1B illustrates schematically a second example of a communication system.

FIG. 1B illustrates schematically a second example of a communication system. The communication system comprises the wireless access point WAP 150, as well as the stations STA 111, 112, 113 within the radio coverage of the wireless local area network WLAN 120. The wireless access point WAP 150 is incorporated in a residential gateway RGW 110. The residential gateway RGW 110 is able to provide services of access to a wide area network WAN 130, such as the internet, to third-party devices. To be able to benefit from the services of access to a wide area network WAN, the stations STA 111, 112, 113 must first be connected to the residential gateway RGW 110 via the wireless local area network WLAN 120 and therefore be paired with the wireless access point WAP 150.

The wireless access point WAP 150, and the stations STA 111, 112, 113, are arranged to implement a multiple pairing. The stations STA 111, 112, 113 are then within the radio coverage of the wireless local area network WLAN 120, but are not paired with the wireless access point WAP 150.

Figure 2:
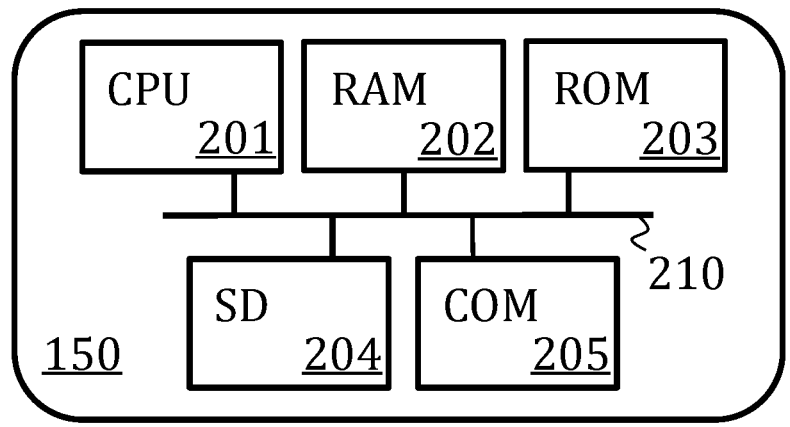
FIG. 2 illustrates schematically an example of hardware architecture included in a wireless access point or in a station of the communication system.

FIG. 2 illustrates schematically an example of hardware architecture included in the wireless access point WAP 150. Each station STA 111, 112, 113 can include a similar hardware architecture. The example of hardware architecture makes it possible to implement the steps, behaviours and algorithms described here for making the multiple pairing.

The hardware architecture comprises, connected by a communication bus 210: a processor or CPU (standing for central processing unit) 201; a random access memory RAM 202; a read-only memory ROM 203, or a rewritable memory of the EEPROM type (electrically erasable programmable ROM), for example of the flash type; a data storage device, such as a hard disk HDD (standing for hard disk drive), or a storage medium reader, such as an SD (standing for Secure Digital) card reader 204; at least one communication interface 205.

The communication interface 205 enables the wireless access point WAP 150 to establish in particular the wireless local area network WLAN 120 and to communicate with any station within radio range, such as the stations STA 111, 112, 113.

The communication interface 205 enables the stations STA 111, 112, 113 to receive beacon frames sent by the wireless access point WAP 150 to signal the wireless local area network WLAN 120 and to communicate with the wireless access point WAP 150.

The processor 201 is capable of executing instructions loaded in the RAM 202 from the ROM 203, from an external memory (not shown), from a storage medium, such as an SD card or the hard disk HDD, or from a communication network. When the hardware architecture is powered up, the processor 201 is capable of reading instructions from the RAM 202 and executing them. These instructions form a computer program causing the implementation, by the processor 201, of the steps, behaviours and algorithms described here.

All or some of the steps, behaviours and algorithms described here can thus be implemented in software form by executing a set of instructions by a programmable machine, such as a DSP (digital signal processor) or a processor, or be implemented in hardware form by a machine or a dedicated component (chip), such as an FPGA (standing for field-programmable gate array) or an ASIC (standing for application-specific integrated circuit). In general terms, the wireless access point WAP 150 and the stations STA 111, 112, 113 comprise electronic circuitry arranged and configured for implementing the steps, behaviours and algorithms described here.

Figure 3:
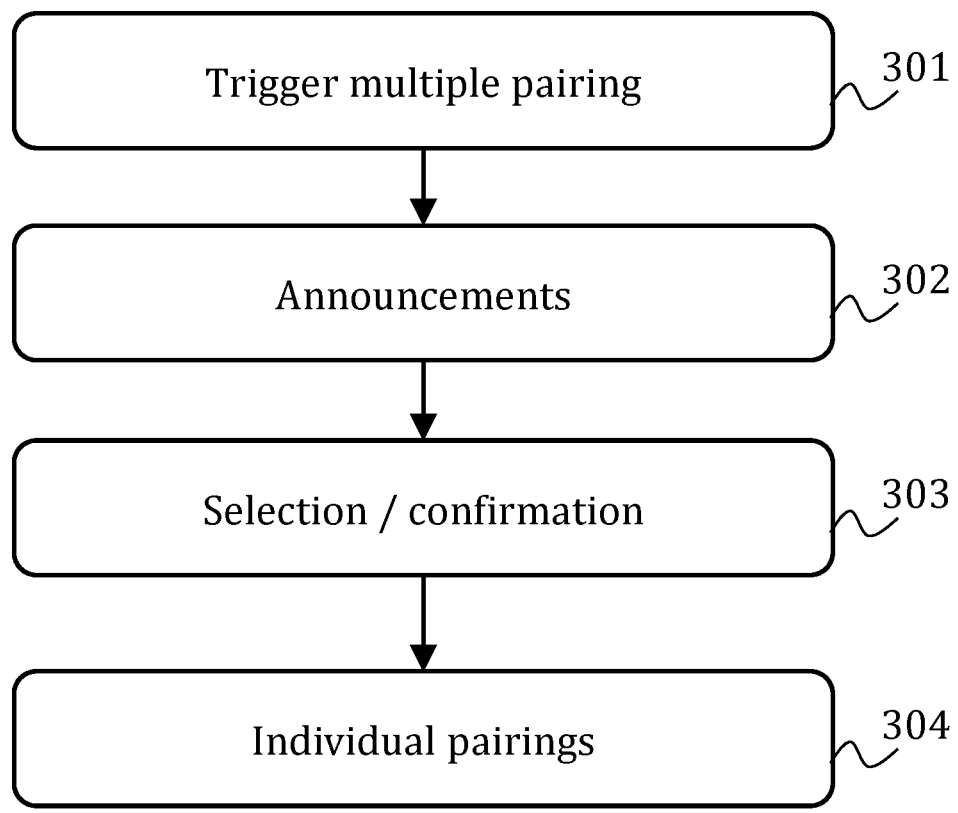
FIG. 3 illustrates schematically a general multiple-pairing algorithm.

FIG. 3 illustrates schematically a general multiple-pairing algorithm.

In a step 301, the multiple pairing is triggered. A multiple-pairing session is then open.

In a preferred embodiment, the triggering of the multiple pairing occurs on simple detection of a pressing on a dedicated button. The button in question is for example a push button on a casing of the wireless access point WAP 150 or a virtual button of a graphical interface displayed on a screen of the wireless access point WAP 150.

In another embodiment, the triggering of the multiple pairing occurs when an instruction is received from a station already paired with the wireless access point WAP 150, enabling it to benefit from the services of the wireless local area network WLAN 120. This station is then authenticated with the wireless access point WAP 150 and executes an application for remote configuration of the wireless access point WAP 150. A screen of the station in question displays a graphical interface that has a virtual button intended for causing a transmission, to the wireless access point WAP 150, of an instruction to trigger the multiple pairing.

In yet another embodiment, the triggering of the multiple pairing occurs automatically on booting, or rebooting, of the wireless access point WAP 150. Thus, installing a new wireless access point, or replacing an obsolete or faulty wireless access point, or replacing an obsolete or faulty residential gateway that incorporates such a wireless access point, is facilitated.

In a step 302, the wireless access point WAP 150 and the stations STA wishing to participate in the multiple pairing make announcements relating thereto. The wireless access point WAP 150 thus gives information about the triggering of the multiple pairing. And in response the stations STA concerned give information about their request to participate in the multiple pairing.

In a particular embodiment, the stations STA that participate in the multiple pairing are the stations STA that are within radio range of the wireless access point WAP 150 and are not paired with any wireless access point WAP (i.e. that are not connected to any wireless local area network WLAN). The stations STA in question are then seeking any wireless local area networks WLAN in their radio environment. The stations STA in question are consequently listening out on a communication medium that can be used for supporting a wireless local area network WLAN. For example, the stations STA in question seek to detect, in a predefined frequency band, and in accordance with a predefined format, beacon frames or messages that would be transmitted by any wireless access points WAP within radio range. Thus the simultaneously installation of a set of stations STA (for example a set of extenders to be associated with a residential gateway) is facilitated. Likewise, a set of stations STA that were disconnected following a replacement of a wireless access point (e.g. replacement of a residential gateway) can thus easily be re-paired.

To announce the triggering of the multiple pairing, the wireless access point WAP 150 includes, for a predefined time T, in beacon frames corresponding to the wireless local area network WLAN 120, a notification of triggering multiple pairing. Preferentially, this notification takes the form of a specific structure of the "information element" IE type giving notification of a multiple-pairing triggering, as defined in the IEEE 802.11 family of standards. The predefined time T corresponds to a declaration period, for example of 2 minutes, during which the stations STA can formulate a request for participation in the multiple pairing. The wireless access point WAP 150 provides, in this information element IE, a multiple-pairing session identifier, which is for example a set of 4 bytes randomly determined, making it possible to reference the multiple-pairing session.

By way of illustration, this information element IE contains:

An identifier of an information element IE specific to the multiple pairing, in one byte, for example "221";

Length information in one byte, for example "9", which represents the number of bytes that still follow in the formation element IE;

An identifier of an organisation, the manufacturer of the wireless access point WAP 150, in three bytes, for example "0x 4065A3";

A content field, composed for example of a type sub-field (for example: "1") with a size equal to one byte, followed by a sub-type sub-field (for example: "1") with a size equal to one byte, and a data sub-field of four bytes containing the multiple-pairing session identifier.

By proceeding thus, the stations STA that are not compatible with the multiple pairing detect that the information-element identifier is unknown to them and therefore ignore this part of the beacon frames received. Compatibility with wireless local area network WLAN stations already existing, and more particularly of the Wi-Fi type, is thus ensured.

The stations STA compatible with the multiple pairing and which are waiting to be paired detect that the information-element identifier corresponds to a multiple-pairing triggering. Each station STA concerned in return announces a request for participation in the multiple pairing, specifying the multiple-pairing session identifier concerned, recovered in the information element IE specific to the multiple pairing in the beacon frames. Preferentially, a hostname of the station STA in question is supplied in addition. The wireless access point WAP 150 can thus take account of the request of said station STA to participate in the multiple pairing.

In a particular embodiment, this response takes the form of an action frame explicitly intended for the wireless access point WAP 150. "Action frame" is a type of management frame of the IEEE 802.11 family of standards on which Wi-Fi networks are based, which is used for requesting a pair, in unicast mode, to trigger an action. For example, this action frame has the following format:

A category identifier, for example "127";

An identifier of an organisation, the manufacturer of the station STA in question, in three bytes, for example "0x4065A3";

A content field, composed for example of a type sub-field (for example: "1") with a size equal to one byte, followed by a sub-type sub-field (for example: "2") with a size equal to one byte, and a data sub-field containing the multiple-pairing session identifier (in four bytes), as well as the hostname of the station STA in question (in four bytes).

In a variant, the response takes the form of a probe-request frame in the IEEE 802.11 family of standards, broadcast by the station STA in question. "Probe request" is a type of general request for information of the IEEE 802.11 family of standards, which is transmitted in broadcast mode in order to obtain information concerning a cell. In this case, the station STA in question includes in the frame a specific information element IE. For example, the information element IE of this probe request has the following format:

An identifier of an information element IE specific to the multiple pairing, for example "221";

Length information in one byte, for example "25", which represents the number of bytes that still follow in the information element IE;

An identifier of an organisation, the manufacturer of the station STA in question, for example "0x4065A3";

A content field, composed for example of a type sub-field (for example: "1") with a size equal to one byte, followed by a sub-type sub-field (for example: "2") with a size equal to one byte, and a data sub-field containing the multiple-pairing session identifier (in four bytes), as well as the hostname of the station STA in question (in sixteen bytes).

When the wireless access point WAP 150 receives such a response, it checks that the multiple-pairing session identifier indicated corresponds to the multiple pairing referenced in its own beacon frames.

If such is not the case, this means that another multiple pairing is announced in parallel. Then, in a particular embodiment, the wireless access point WAP 150 immediately ends the multiple-pairing session, and may send an error signal. In one embodiment, the error signal is a blinking of a red-coloured light-emitting diode at a frequency of 4 Hz for 5 seconds.

Otherwise, the wireless access point WAP 150 adds the name of the station STA that responded in a list L, initially empty, if it is not already found therein. It should be noted that the response in question also enables the wireless access point WAP 150 to obtain the MAC (media access control) address of the station STA in question.

The multiple-pairing session identifier, as well as the hostname, returned by the station STA to the wireless access point WAP 150 thus contributes to securing the pairing process.

Thus, at the end of the predefined time T, the wireless access point WAP 150 ceases signalling the trigging of the multiple pairing in the beacon frames, and the list L enumerates the stations STA to be considered for the multiple pairing. One alternative to the expiry of the predefined time T is a detection of a pressing on a dedicated button. The button in question is for example a push button on the casing of the wireless access point WAP 150 or a virtual button of the graphical interface displayed on a screen of the wireless access point WAP 150, which makes it possible to request an early end of the declaration period. In a variant, an alternative to the expiry of the predefined time T is a reception of an instruction from the station, already paired with the wireless access point WAP 150, which triggered the multiple pairing by virtue of its application for remote configuration of the wireless access point WAP 150. A screen of the station in question displays a graphical interface that presents a virtual button intended to prevent any new entry in the list L. Pressing on this button causes a transmission to the wireless access point WAP 150 of an instruction for early stoppage of the declaration period, i.e. stopping signalling of the multiple pairing in the beacon frames and preventing any new entry in the list L.

In an optional step 303, a selection and confirmation step is performed among the stations STA enumerated in the list L.

In one embodiment, a screen of the wireless access point WAP 150 displays a graphical interface in which all the stations STA enumerated in the list L are presented, preferentially using their hostnames.

In another embodiment, the display is made on a station already paired with the wireless access point WAP 150 and which triggered the multiple pairing by means of the aforementioned application. A screen of the station in question displays a graphical interface in which there are presented all the stations STA enumerated in the list L, which was supplied by the wireless access point WAP 150 in response to the instruction to trigger the multiple pairing.

The wireless access point WAP 150 can supply the enumeration of the stations STA when the declaration period expires. The wireless point WAP 150 can also supply the enumeration thereof as the stations STA formulate their requests for participation in the multiple pairing. This in particular enables the user to be sure of the stations that have already declared for the multiple pairing, if he wishes to anticipate the end of the declaration period by pressing on a button.

Figure 5:
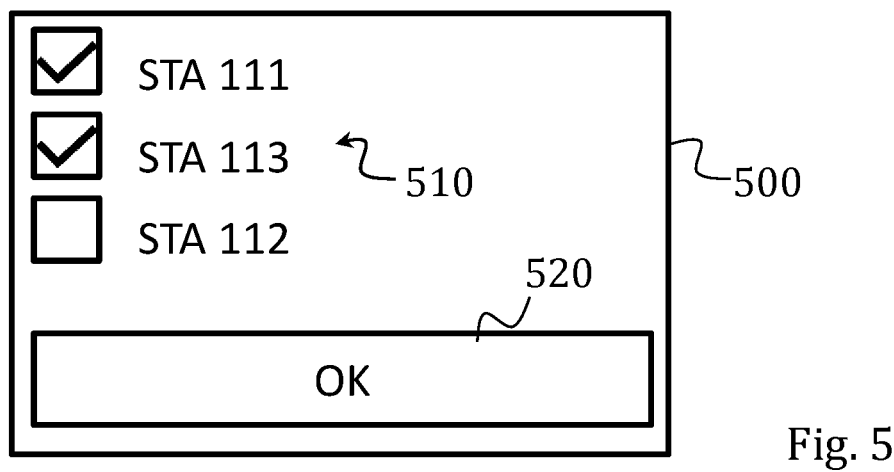
FIG. 5 illustrates schematically a graphical interface adapted for selecting and confirming stations to be treated in multiple pairing.

FIG. 5 illustrates schematically an example of a display 500 of such a graphical interface. Icons make it possible to confirm (ticked boxes in FIG. 5) or deny (unticked box in FIG. 5) the taking account of such and such a station STA in the multiple pairing. The list L is updated according to a user choice confirmed via the graphical interface (virtual button OK 520 in FIG. 5), which the station STA in question then transmits to the wireless access point WAP 150.

Returning to FIG. 3, in a step 304 individual pairing procedures are successively implemented between the wireless access point WAP 150 and the stations STA enumerated in the list L. It should be noted that the step 303 is optional, which means that, in some embodiments, the list L used for the individual pairing procedures is the one resulting from the step 302.

During the individual pairing procedures, each station STA is considered without taking account of the other stations STA in the list L. In each individual pairing procedure, the wireless access point WAP 150 and a single station STA make message exchanges in order to perform a mutual authentication to validate the pairing. The message exchanges of each individual pairing procedure take place exactly as in the case of a single pairing. Multiple pairing is thus simple to implement, and the access points WAP and stations STA already existing can be improved by means of simple updates.

To make the individual pairings, the wireless access point WAP 150 runs through the list L and, for each station STA, the wireless access point WAP 150 signals to the station STA in question when it is its turn.

In a particular embodiment, the triggering of the individual pairing for a station STA takes the form of a specific information element IE notifying the triggering of the individual pairing. The information element IE includes the MAC address of the station STA in question. The information element IE is included in the beacon frames transmitted by the wireless access point WAP 150 during a time T' (for example 30 seconds).

By way of illustration, this information element IE contains:
An identifier of an information element IE specific to the multiple pairing, in one byte, for example "221";
Length information in one byte, for example "11", which represents the number of bytes that still follow in the information element IE;
An identifier of an organisation, a manufacturer of the wireless access point WAP 150, in three bytes, for example "0x4065A3";
A content field, composed for example of a type sub-field (for example: "1") with a size equal to one byte, followed by a sub-type sub-field (for example: "3") with a size equal to one byte, and a data sub-field of six bytes containing the MAC address of the station STA concerned.

In a variant, this response takes the form of an action frame intended explicitly for the station STA in question (i.e. by means of its MAC address). For example, this action frame has the following format:
A category identifier, for example "127";
An identifier of an organisation, the manufacturer of the station STA in question, in three bytes, for example "0x4065A3";
A content field, composed for example of a type sub-field (for example: "1") with a size equal to one byte, followed by a sub-type sub-field (for example: "3") with a size equal to one byte.

An individual pairing session then takes place between the wireless access point WAP 150 and the station STA in question. In the WPS technology, the wireless access point WAP 150 fulfils the role of "Registrar" and the station STA in question fulfils the role of "Enrolee".

At the end of the individual pairing session, and whatever the result thereof (success or failure), the wireless access point WAP 150 recommences the same individual pairing procedure with the following station STA in the list L, until it has thus processed all the stations STA enumerated in the list L. The multiple pairing is then ended.

The multiple pairing approach makes it possible to proceed with a plurality of pairings of stations with a wireless access point WAP during one and the same pairing session. In addition, the multiple pairing approach proposed centralises the user actions on the wireless access point WAP or on an application of a terminal already paired with the wireless access point WAP, which is simpler than the WPS approaches known until then: there is here no need to manipulate both the wireless access point WAP and each station STA in order to make the pairings.

Figure 4:
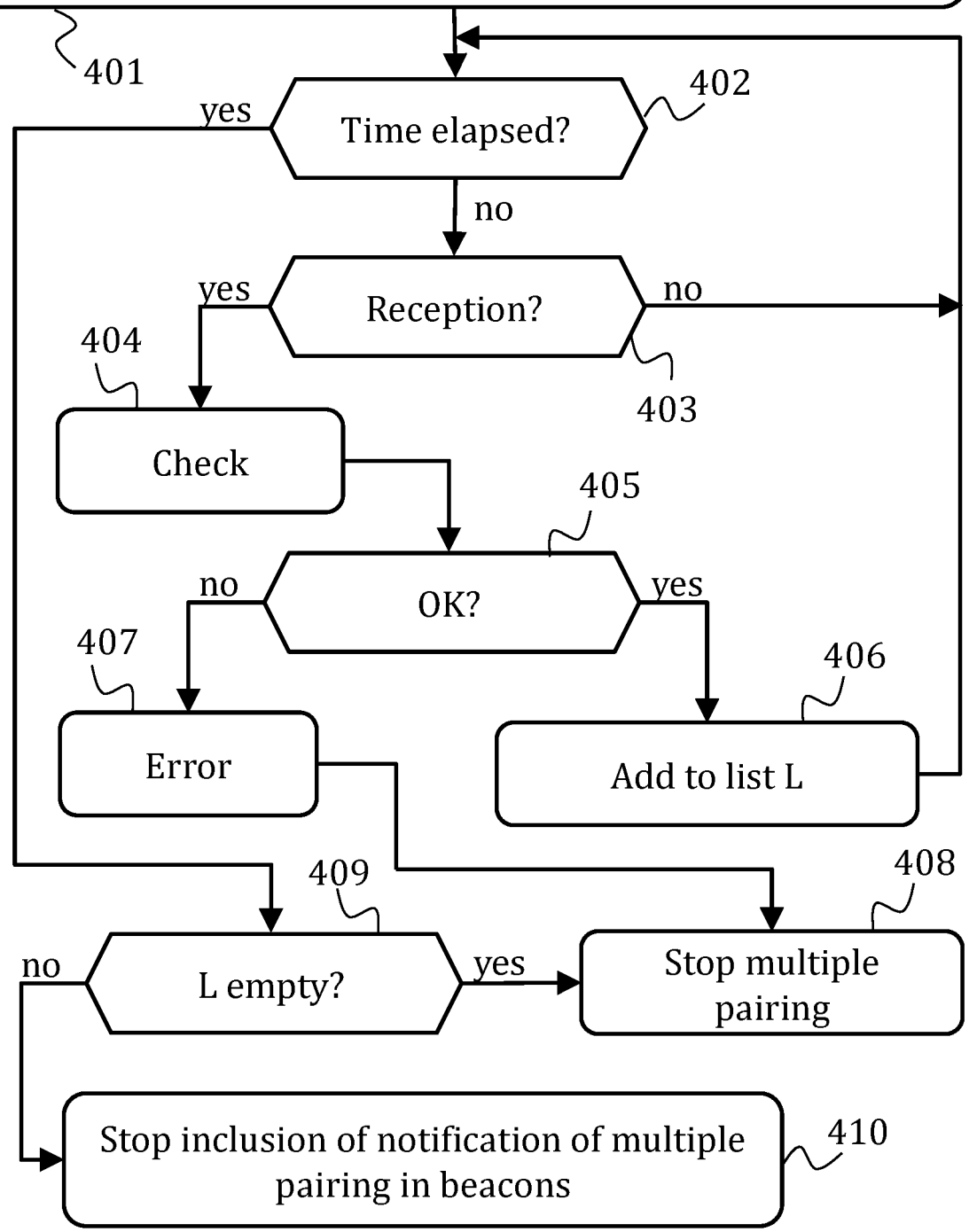
FIG. 4 illustrates schematically an algorithm for initiating multiple pairing, in a particular embodiment.

FIG. 4 illustrates schematically a multiple-pairing initiation algorithm, in a particular embodiment. The algorithm in FIG. 4 is implemented by the wireless access point WAP 150 when a multiple pairing has been triggered.

In a step 401, the wireless access point WAP 150 includes a notification of multiple-pairing triggering in beacon frames broadcast by the wireless access point WAP 150 in the context of the wireless local area network WLAN 120. The wireless access point WAP 150 proceeds thus during the aforementioned time T.

In a step 402, the wireless access point WAP 150 checks whether the aforementioned time T has elapsed (i.e. the declaration period has ended). If such is the case, a step 409 is performed; otherwise a step 403 is performed.

In the step 403, the wireless access point WAP 150 checks whether a request for participation in the multiple pairing has been received. If such is the case, a step 404 is performed; otherwise the step 402 is repeated.

In the step 404, the wireless access point WAP 150 checks the response received. The wireless access point WAP 150 checks in particular that the request for participation in the multiple pairing does indeed include a multiple-pairing session identifier that is supplied in the notification of multiple-pairing triggering added to the broadcast beacon frames.

In a step 405, the wireless access point WAP 150 checks whether an error has occurred in the verification of the step 404, for example if another multiple pairing is also announced in parallel and the response received ultimately concerns this other multiple pairing. If such is the case, a step 407 is performed; otherwise a step 406 is performed.

In the step 406, the wireless access point WAP 150 adds to a list L an identifier, such as its MAC address and/or its hostname, of the station STA that transmitted the response received. Then the step 402 is repeated.

In the step 407, the wireless access point WAP 150 notifies the error (e.g. switching on a light emitting diode) and ends the multiple pairing in a step 408, which also ends the algorithm of FIG. 4.

In the step 409, the wireless access point WAP 150 checks whether, at the end of the declaration period, the list L is empty. If such is the case, no pairing is to be made and the wireless access point WAP 150 ends the multiple pairing in the step 408; otherwise a step 410 is performed.

In the step 410, the wireless access point WAP 150 stops the inclusion, in the broadcast beacon frames, of the notification of triggering of multiple pairing. And the algorithm in FIG. 4 is ended. Any request for participation in the multiple pairing that would be received subsequently (for this same multiple-pairing session) is ignored.

Figure 6:
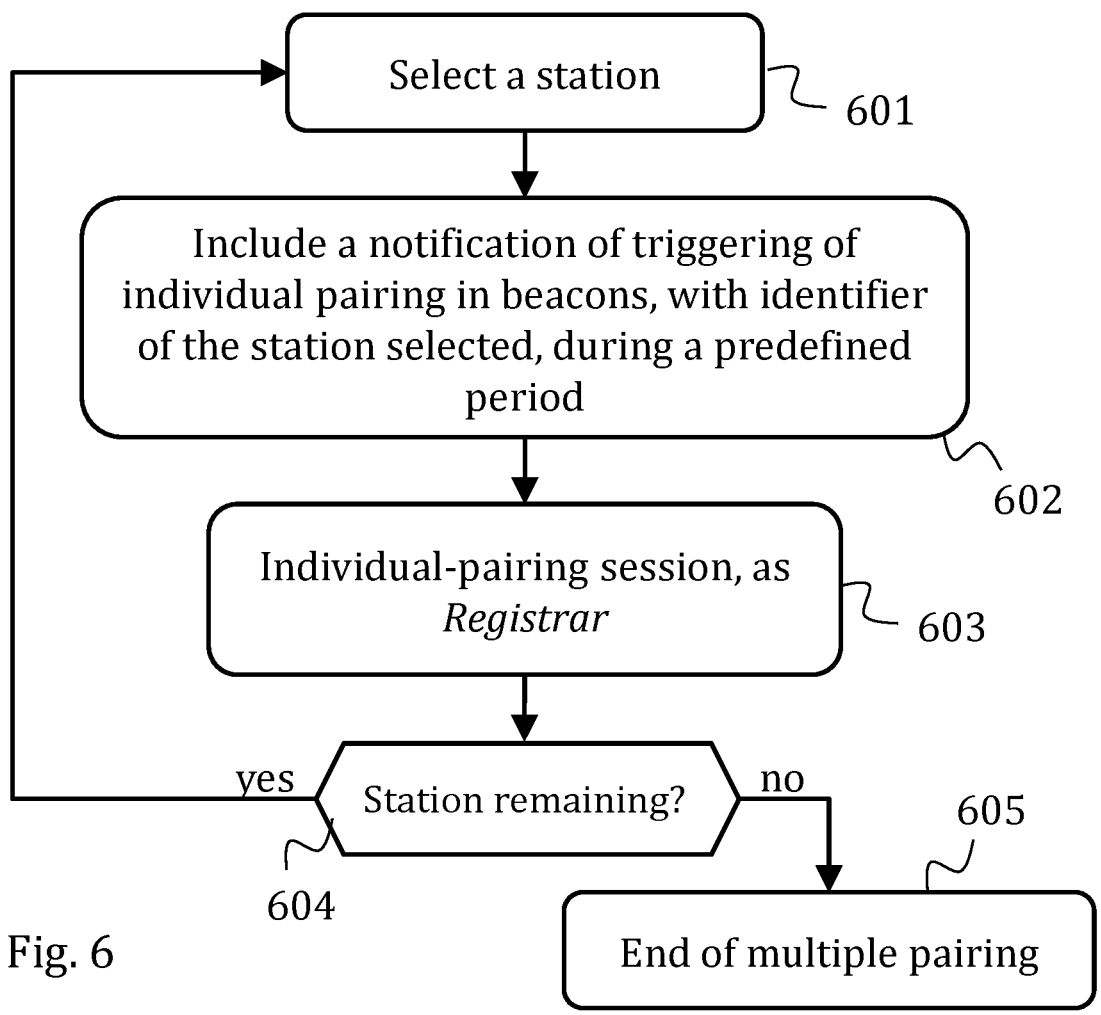
FIG. 6 illustrates schematically an algorithm for successive executions of individual pairing procedures in one and the same pairing session.

FIG. 6 illustrates schematically an algorithm for successive executions of individual-pairing procedures in one and the same pairing session. The algorithm in FIG. 6 is implemented by the wireless access point WAP 150 when the list L is not empty.

In a step 601, the wireless access point WAP 150 selects a station STA enumerated in the list L. The wireless access point WAP 150 will seek to start an individual-pairing session with the selected station STA.

In a step 602, the wireless access point WAP 150 includes a notification of triggering of individual pairing in beacon frames broadcast by the wireless access point WAP 150 in the context of the wireless local area network WLAN 120. The notification includes the MAC address of the selected station. The wireless access point WAP 150 proceeds thus at the most during the aforementioned time T'.

If at the expiry of the aforementioned time T' the station STA selected has not participated in the individual-pairing session, the wireless access point WAP 150 stops the inclusion of the notification of triggering of individual pairing in the beacon frames and passes directly to a step 604.

In a step 603, the wireless access point WAP 150 takes the role of Registrar, and implements the individual-pairing session with the selected station STA. The selected station STA, which detected its MAC address in the beacon frames broadcast by the wireless access point WAP 150, is supposed to take the role of Enrolee. A conventional individual-pairing procedure can then automatically be established.

In the step 604, whatever the result of the individual-pairing session, the wireless access point WAP 150 stops the inclusion of the notification of triggering of individual pairing in the beacon frames and checks whether there remains at least one station STA to be processed in the list L. If such is the case, the step 401 is repeated by selecting another station STA in the list L; otherwise a step 605 is performed wherein the wireless access point WAP 150 ends the multiple pairing.

In a particular embodiment, when a station STA detects more than one multiple pairing session in a predefined interval of time (for example 2 minutes), the station STA ignores any proposal for multiple pairing and also ignores any proposal for individual pairing during a predefined period (for example 5 minutes). This avoids pairings with an erroneous wireless access point WAP.

It can be noted that the pairing procedure disclosed here also functions in the case where a single station responds during the declaration period. It is in this case not a question literally of a "multiple" pairing but of an individual pairing that has followed the procedure of a multiple pairing.

The invention claimed is:

1. A multiple-pairing method for pairing a plurality of stations with a wireless access point of a wireless local area network, the wireless access point broadcasting beacon frames relating to the wireless local area network, the method being implemented by the wireless access point and comprising:
   including, by the access point, in the broadcast beacon frames, a notification of triggering of multiple pairing including a multiple-pairing session identifier, during a declaration period of predefined maximum duration;
   receiving, by the access point, requests for participation in the multiple pairing coming from the stations, the requests including the multiple-pairing session identifier, and creating, from the requests received, a list of stations to be paired; and
   when the declaration period expires, making, by the access point, individual pairings in turn with each of the stations in the list.

2. The method according to claim 1, comprising:
   providing, for display on a graphical interface, the list of stations from which the requests were received;
   receiving a confirmation of the list of stations to be paired, or a selection of stations to be paired from the list provided; and
   making the individual pairings in turn, and for only the selected stations where applicable.

3. The method according to claim 2, wherein the requests each include a hostname of the station that transmitted the request in question, and wherein the list of the stations that is provided for display on the graphical interface is a list of the hostnames.

4. The method according to claim 2, wherein the list of the stations for display on the graphical interface is provided as the requests for participation in the multiple pairing are received, and comprising:
   receiving the confirmation of the list of the stations to be paired, or the selection of stations to be paired from the list provided, before the predefined maximum duration of the declaration period has expired, and ending the declaration period early.

5. The method according to claim 1, wherein the graphical interface provided by a station previously paired with the wireless access point.

6. The method according to claim 1, wherein the beacon frames have a format defined by the IEEE 802.11 family of standards, and the notification of triggering of the multiple pairing is in the form of a structure of the dedicated information element IE type.

7. The method according to claim 1, comprising:
   initiating each individual pairing by including, in the beacon frames, for each station to be paired in its turn, a notification of triggering of individual pairing including the MAC address of the station in question, the MAC address having been obtained by receiving the request for participation in the multiple pairing coming from the station in question.

8. The method according to claim 7, wherein the beacon frames have a format defined by the IEEE 802.11 family of standards, and the notification of triggering of individual pairing is in the form of a structure of the dedicated information element IE type.

9. The method according to claim 1, wherein the wireless access point and the stations exchange messages in a format defined by the IEEE 802.11 family of standards, and comprising:
- initiating each individual pairing by sending, to each station to be paired, in its turn, a frame of the dedicated action frame type.

10. The method according to claim 1, wherein the wireless access point and the stations exchange messages in a format defined by the IEEE 802.11 family of standards, and wherein the requests for participation in the multiple pairing are in the form of broadcast frames of the probe request type including a structure of the dedicated information element IE type.

11. The method according to claim 1, wherein, the wireless access point and the stations exchange messages in a format defined by the IEEE 802.11 family of standards, and wherein the requests for participation in the multiple pairing is in the form of dedicated frames of the "action frame" type.

12. The method according to claim 1, comprising, before the declaration period expires:
- on reception of a request for participation in another multiple pairing identified by another multiple-pairing session identifier, ending the multiple pairing.

13. The method according to claim 1, wherein the stations that send the requests for participation in the multiple pairing are stations that are not paired with any wireless access point at the time of receiving the multiple-pairing triggering notification.

14. The method according to claim 1, wherein, when a station detects more than one multiple pairing session in a predefined interval of time, the station in question ignores any proposal for multiple pairing and also ignores any proposal for individual pairing during a predefined period.

15. A non-transitory storage medium storing a computer program comprising instructions for implementing the method according to claim 1, when the instructions are read from the information storage medium and executed by a processor.

16. A wireless access point configured for making a multiple pairing, making it possible to pair a plurality of stations with a wireless access point of a wireless local area network, the wireless access point broadcasting beacon frames relating to the wireless local area network, the wireless access point comprising electronic circuitry configured for:
- including, in the broadcast beacon frames, a notification of triggering of multiple pairing including a multiple-pairing session identifier, during a declaration period of predefined maximum duration;
- receiving requests for participation in the multiple pairing coming from said stations, the requests including the multiple-pairing session identifier, and creating, from the requests received, a list of stations to be paired; and
- when the declaration period expires, making individual pairings in turn with each of the stations in the list.

17. A multiple-pairing method for pairing a plurality of stations with a wireless access point of a wireless local area network, the wireless access point broadcasting beacon frames relating to the wireless local area network, the method being implemented by the wireless access point and comprising:
- including, by the access point, in the broadcast beacon frames, a notification of triggering of multiple pairing including a multiple-pairing session identifier, during a declaration period of predefined maximum duration;
- receiving, by the access point, requests for participation in the multiple pairing coming from the stations, the requests including the multiple-pairing session identifier, and creating, from the requests received, a list of stations to be paired; and
- when the declaration period expires, making, by the access point, individual pairings in turn with each of the stations in the list, wherein the stations that send the requests for participation in the multiple pairing are stations that are not paired with any wireless access point at the time of receiving the multiple-pairing triggering notification.

* * * * *